US010514940B2

(12) United States Patent
Sheehan et al.

(10) Patent No.: US 10,514,940 B2
(45) Date of Patent: Dec. 24, 2019

(54) VIRTUAL APPLICATION PACKAGE RECONSTRUCTION

(75) Inventors: John M. Sheehan, Cambridge, MA (US); Cread W. Mefford, Malden, MA (US); Ted Kotei Annan, Chelsea, MA (US); Jeb Remus, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1318 days.

(21) Appl. No.: 12/725,824

(22) Filed: Mar. 17, 2010

(65) Prior Publication Data

US 2011/0231837 A1 Sep. 22, 2011

(51) Int. Cl.
*G06F 9/455* (2018.01)
*G06F 8/61* (2018.01)
*G06F 8/65* (2018.01)

(52) U.S. Cl.
CPC ............ *G06F 9/45537* (2013.01); *G06F 8/63* (2013.01); *G06F 8/65* (2013.01)

(58) Field of Classification Search
None
See application file for complete search history.

(56) References Cited

U.S. PATENT DOCUMENTS

| 5,892,900 | A * | 4/1999 | Ginter et al. ................... 726/26 |
| 6,282,711 | B1 | 8/2001 | Halpern |
| 6,324,691 | B1 | 11/2001 | Gazdik |
| 6,954,930 | B2 | 10/2005 | Drake |
| 7,533,380 | B2 | 5/2009 | Neuer |
| 2002/0087963 | A1 | 7/2002 | Eylon |
| 2004/0091114 | A1* | 5/2004 | Carter ................... G06F 21/606 380/259 |
| 2004/0148184 | A1* | 7/2004 | Sadiq ............................... 705/1 |
| 2006/0020937 | A1 | 1/2006 | Schaefer |
| 2007/0180446 | A1 | 8/2007 | Sirota |

(Continued)

FOREIGN PATENT DOCUMENTS

CN 101027639 A 8/2007

OTHER PUBLICATIONS

Novell "Novell Zen Works Application Virtualization" 3/09, 16 pages, downloaded from http://www.novell.com/rc/docrepository/public/37/basedocument.2008-09-10.1290462030/4622092PRINT_en.pdf on Jan. 18, 2010.

(Continued)

*Primary Examiner* — Jamie R Kucab
(74) *Attorney, Agent, or Firm* — Watson Patents, PLC; Vladan M. Vasiljevic (57) ABSTRACT

Techniques for creating and using a recipe to create a virtual package for a virtual application. Existing methods for creating virtual packages may require the use of an expert or may not be reliable. In some embodiments, a dehydrator is use to create a recipe. The dehydrator may take as input a reference virtual package and install media for the application and output a recipe that may be used to create a particular virtual package for a particular operating system and/or environment. In some embodiments, a rehydrator may be used to create a particular virtual package from a recipe. The rehydrator may take as input a recipe and install media for an application and output a particular virtual package for a particular operating system and/or environment.

20 Claims, 6 Drawing Sheets

(56) References Cited

U.S. PATENT DOCUMENTS

| | | | |
|---|---|---|---|
| 2008/0163171 A1* | 7/2008 | Chess et al. | 717/120 |
| 2008/0250044 A1 | 10/2008 | Adams | |
| 2008/0263511 A1* | 10/2008 | Shapiro | G06F 8/61 717/104 |
| 2009/0133013 A1 | 5/2009 | Criddle | |
| 2009/0271787 A1 | 10/2009 | Clark | |
| 2009/0288076 A1* | 11/2009 | Johnson et al. | 717/168 |
| 2009/0307684 A1* | 12/2009 | Best et al. | 717/174 |
| 2010/0095228 A1* | 4/2010 | Hwang et al. | 715/762 |
| 2010/0138818 A1* | 6/2010 | Harrop et al. | 717/153 |
| 2010/0229242 A1* | 9/2010 | Iga | 726/27 |
| 2010/0242028 A1* | 9/2010 | Weigert | 717/131 |
| 2010/0293540 A1* | 11/2010 | Sheehan | G06F 8/60 717/174 |
| 2011/0035747 A1* | 2/2011 | Machida | 718/100 |
| 2011/0153697 A1* | 6/2011 | Nickolov | G06F 9/4856 707/827 |
| 2011/0153839 A1* | 6/2011 | Rajan | H04L 47/32 709/227 |

OTHER PUBLICATIONS

Microsoft Download Center "Application Virtualization Dynamic Suite Composition Tool" Oct. 29, 2008, 1 page, downloaded from http://www.microsoft.com/downloads/details.aspx?FamilyID=daa898df-455f-438a-aa2a-421f05894098&displaylang=en on Jan. 18, 2010.

W3C "XML-binary Optimized Packaging" Jan. 25, 2005, 15 pages, downloaded from http://www.w3.org/TR/xop10 on Jan. 18, 2010.

University of Auckland, Faculty of Science "Windows Application Virtualisation" 6 pages, Nov. 3, 2009, downloaded from https://www.sit.auckland.ac.nz/Windows_Application_Virtualisation on Jan. 18, 2010.

Chinese Patent Application No. 201110072225.4, Amendment dated Jun. 12, 2015, 14 pages (including English translation of amended claims).

Chinese Patent Application No. 201110072225.4, Notice of Allowance dated Sep. 25, 2015, 6 pages (including English translation of allowed claims).

"First Office Action and Search Report Issued in Chinese Patent Application No. 201110072225.4", dated Jan. 28, 2015, 11 Pages.

* cited by examiner

VIRTUAL APPLICATION PACKAGE RECONSTRUCTION

BACKGROUND

Users of a computer may wish to install additional applications on the computer or to upgrade existing applications to a new version. For example, a user who would like to use a spreadsheet program may wish to install MICROSOFT OFFICE® or may wish to upgrade an existing MICROSOFT OFFICE® installation to a newer version.

The installation of an application may begin with install media. For example, the install media may be a CD, a DVD, a remote computer, or a remote computer-readable medium. The user may execute a program on the install media that may lead the user through a multi-step process of installing the application. The installation process may involve specifying where the application is to be installed, which users will have access to the application, options for the application, and whether the user agrees to a licensing agreement.

The installation of an application on a computer may change aspects of the operating system and may impact other applications previously installed on the computer. For example, installing an application on a computer may include adding files to the computer or altering existing files. Some of these files may be stored in a location specific to the application being installed and some of these files may be stored in locations where they may be shared with other applications or with the operating system.

The installation of an application may also change the environment of the operating system. For example, applications on a computer may interact with the operating system, and accessing or modifying the environment may facilitate interaction with the operating system. Applications may also interact with other applications, and accessing or modifying the environment may facilitate interaction with other applications. Further, the user may set options or other configuration values in the environment to control aspects of installed applications.

The environment of an operating system may be specified in numerous ways, one of which may be a centralized repository of information. For example, in the MICROSOFT WINDOWS® operating system, the environment includes the registry, which includes key-value pairs. In the Apple OS X operating system the environment may include plist or property list files. In the LINUX® operating system, the environment may include various files stored in a directory with the path "/etc."

In some situations, it may be advantageous to use virtual applications instead of conventional applications. A virtual application is different from a conventional application in that the installation of a virtual application does not modify files on the operating system and also does not modify the environment of the operating system.

Where a user uses virtual applications instead of or in addition to conventional applications, the user may have a virtual application client installed on his or her computer. The virtual application client may have a list of virtual applications that are available to the user. Where a user wishes to use one of the virtual applications and that virtual application is not already present on the user's computer, the virtual application client may download a virtual package from a server and install the virtual application on the user's computer. The server may be operated by an administrator who makes the virtual packages available to users.

Figure 1:
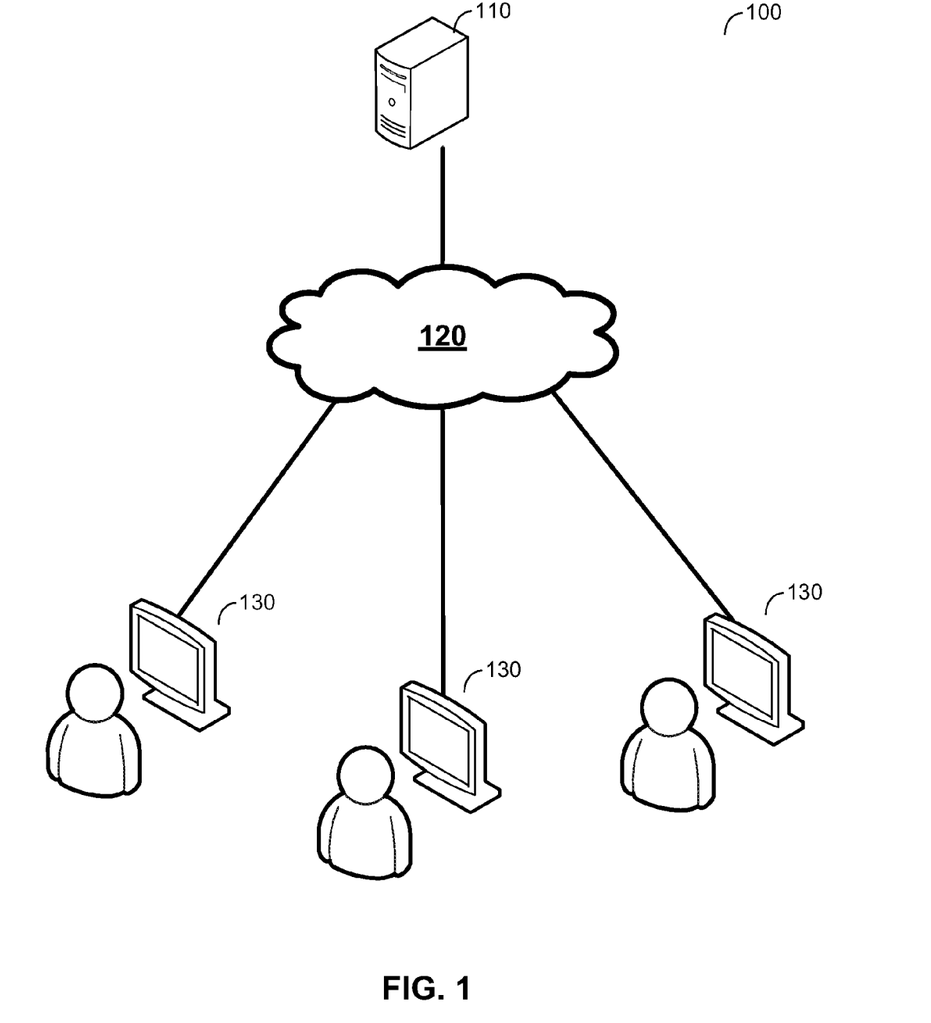
FIG. 1 illustrates an exemplary computer network in which users may use virtual applications.

FIG. 1 illustrates an exemplary computer network 100 in which one or more users 130 may use virtual applications. Users 130 may be connected to a computer network 120, such as the Internet. A server 110 may also be connected to the network, and server 110 may have one or more virtual packages corresponding to virtual applications that are available to users 130. Users 130 may download virtual packages from server 110 and then use the virtual packages to install virtual applications on the users' computers.

Figure 2:
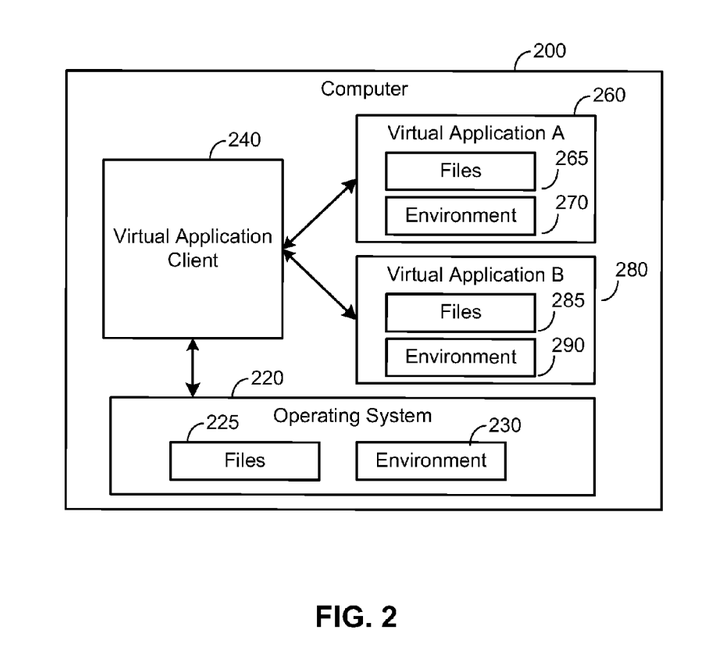
FIG. 2 illustrates a computer on which virtual applications may be executed.

FIG. 2 illustrates a computer 200 with a virtual application client 240 that allows a user to run virtual applications. Computer 200 may have an operating system 220. Operating system 220 may have files 225 and an environment 230. Operating system 220 may also have conventional applications (not shown). Computer 200 may also have one or more virtual applications, for example, virtual application 260 and virtual application 280. Virtual application client 240 provides an operating environment for virtual applications as if the virtual applications were executing in an environment created by operating system 220 without requiring the virtual applications to interact directly with operating system 220. Consequently, each virtual application may have its own files and environment. For example, virtual application 260 may have files 265 and environment 270, and virtual application 280 may have files 285 and environment 290.

When a user requests to run a virtual application, virtual application client 240 may check to see if the user has previously installed the virtual application and may also check to see if a newer version of the virtual application is available. Where the user has not previously installed the virtual application or a newer version is available, virtual application client 240 may download a virtual package from server 110 corresponding to the virtual application. After the virtual application client downloads the virtual package, the virtual application may then be available on the user's computer.

The virtual packages may be generated in advance. In an enterprise setting, a network administrator, for example, may create virtual packages intended for use on user computers throughout the enterprise. Creating a virtual package may involve the use of a sequencer. To create a virtual package with a sequencer, the administrator may install a conventional application from install media to a computer and follow the multi-step process of configuring the computer to execute the conventional application. The sequencer may record all changes made to the computer during the install process and create a virtual package that embodies changes made to the computer during installation of the conventional application. In some scenarios, the network administrator may require advice of an expert, which may be obtained by engaging the expert directly to make the virtual package or by accessing information that the expert has written and made available.

SUMMARY

While virtual applications have benefits over conventional applications, the Applicants have recognized and appreciated that the use of virtual applications may be expanded by reducing complexity associated with the creation of virtual packages. A virtual package may need to be compatible with the user's particular operating system and environment, and thus a single virtual package may not work properly with all computers and particular virtual packages may need to created to be compatible with a user's computer. A particular virtual package is one that is created for a specific operating system and/or environment.

Applicants have appreciated that the process of creating a particular virtual package for a virtual application may be improved through the use of a recipe. A recipe provides information than can be used to create a particular virtual package from install media without the use of a sequencer. In some embodiments, a recipe may contain metadata that explains how files and other information from the install media can be put into a particular virtual package and may also contain a payload that contains files that can be put into a particular virtual package.

In embodiments of the invention described herein, a reference virtual package for an application and install media for the application may be used to create a recipe through the use of a dehydrator. The reference virtual package may be created by an expert or using information obtained from an expert. The dehydrator may select information from the reference virtual package, for example a file or information in the virtual package environment, and determine whether that information is present on the install media. If the information is present on the install media, dehydrator may store information in the recipe indicating the location of the information in the reference virtual package and/or in the install media. If the information is not present on the install media, the dehydrator may store the information as payload in the recipe. By repeating this process for other information in the reference virtual package, the recipe may create a complete description of the reference virtual package.

In embodiments of the invention described herein, a recipe and install media may be used to create a particular virtual package for an application through the use of a rehydrator. The rehydrator selects information from the recipe and uses that information to create the particular virtual package. Where the information from the virtual package relates to information on the install media (e.g., a file), the rehydrator may copy that file to the appropriate location in the particular virtual package. Where the information in the recipe relates to payload in the recipe, the rehydrator may copy information in the payload to the appropriate location in the particular virtual package. Where the information relates to the environment in which the particular virtual package will be installed, the rehydrator may alter contents of the virtual package that specify the environment.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that administrators and users of virtual applications may benefit from having a simpler and more reliable method for creating virtual packages. By simplifying the process for creating virtual packages, administrators may be able to offer a greater number and variety of virtual packages. Simplifying the process may also decrease the administrator's costs in making the virtual packages available.

Applicant's have further appreciated that the creation of virtual packages may be made simpler and more reliable through the use of a recipe and a reference virtual package. A reference virtual package is a virtual package for the application, which can be created in any suitable way. For example, a reference virtual package may be created using a sequencer, as described in greater detail below, in conjunction with expert input. As a reference virtual package may not be compatible with all operating systems and environments, it may be necessary to create a particular virtual package that is compatible with a user's operating system and environment. A particular virtual package is one that is created for a specific operating system and/or environment.

A recipe provides information than can be used to create a particular virtual package from install media. A recipe may contain information that encapsulates expert input, indicating such things as parameters of the environment of the virtual application that may need to be set. The virtual package may identify files and other information from the install media to be included in a virtual package and may also contain a payload that contains files to be included in a virtual package. The process of creating a particular virtual package from a recipe may be simpler and more reliable than other methods for creating a particular virtual package.

Figure 3:
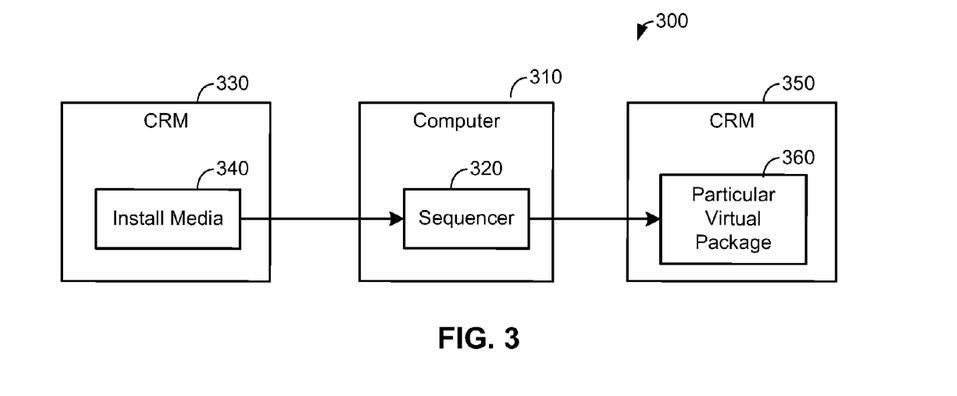
FIG. 3 is a block diagram of a system that may be used to create a virtual package from install media using a sequencer.

FIG. 3 shows a block diagram of a system 300 for creating a particular virtual package 360 for an application from install media 340 for the application using a sequencer 320, which may be a sequencer as is known in the art. In system 300, computer 310 may be a clean installation of the operating system and environment for which the particular virtual package 360 is intended. In some embodiments, computer 310 may be a virtual machine running the target operating system and environment.

In creating particular virtual package 360, system 300 operates to install the application from install media 340 onto computer 310 such that the application will execute in a virtual environment. Install media 340 may be stored on a computer-readable medium 330, which may be internal or external to computer 310.

The installation may be performed by an expert or may be performed using instructions, tips or hints provided by an expert. While the application is being installed from install media 340 to computer 310, sequencer 320 may record changes made to computer 310. Changes to computer 310 during the installation of the application may include the addition of files to computer 310, the modification of files on computer 310, and changes to the environment of computer 310. Regardless of the types of changes that occur, they may be reflected in the particular virtual package 360.

Following the conventional installation of the application, sequencer 320 may create particular virtual package 360 and may store it on computer-readable medium 350, which may be internal or external to computer 310. Particular virtual package 360 may be intended to function on computers with the same operating system and environment as computer 310 and may or may not function on other operating systems and/or environments.

System 300 may work well for simpler applications but may not work well for more complicated applications. For more complicated applications, finding an applying expert knowledge needed to properly create particular virtual package 360 may be problematic, and therefore may entail greater time and expense for the administrator of the virtual package. Further, a particular virtual package may not work correctly, and testing may be required before deployment of particular virtual package 360, which may also entail greater time and expense for the administrator.

Figure 4:
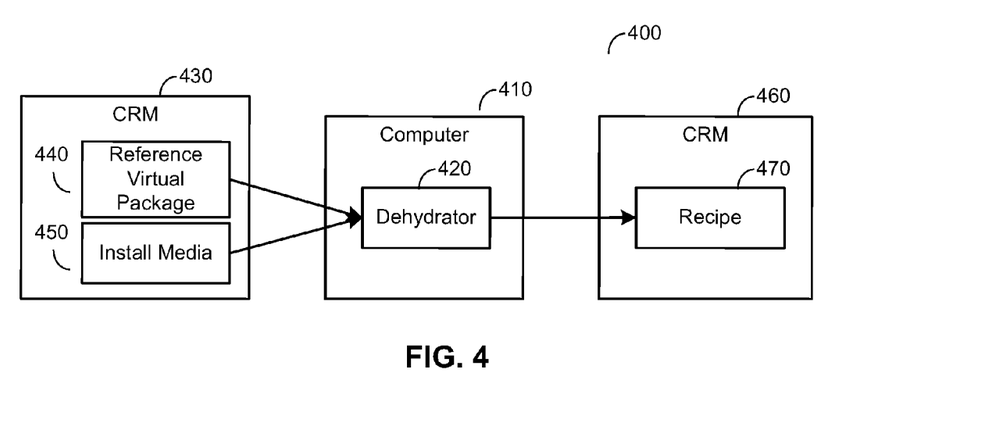
FIG. 4 is a block diagram of a system that may be used to create a recipe for creating a particular virtual package from a reference virtual package and install media.
Figure 5:
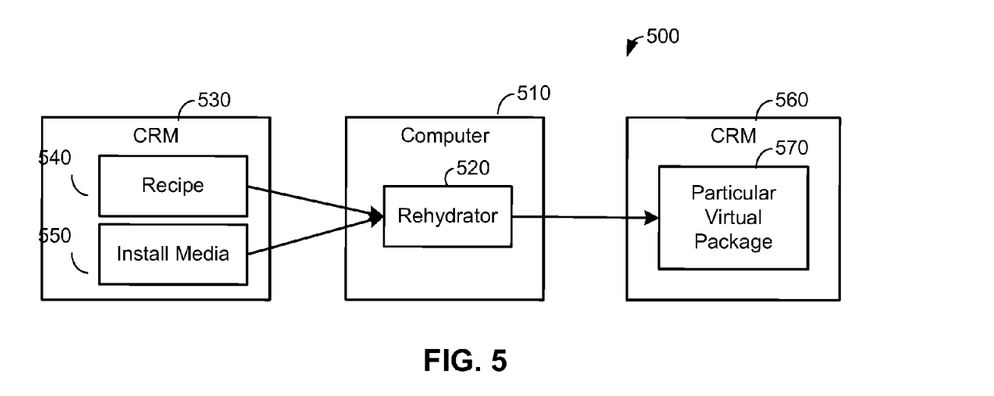
FIG. 5 is a block diagram of a system that may be used to create a particular virtual package from a recipe and install media.

Applicants have appreciated that as an alternative to the sequencer 320 of system 300, a recipe may instead be used to create a particular virtual package. The recipe encapsulates expert knowledge about requirements for a virtual package. This knowledge is formatted in a way that can be easily applied to create a particular virtual package. FIG. 4 shows a block diagram of a process for creating a recipe that can be used to create a particular virtual package. FIG. 5 shows a block diagram of a process for creating a particular virtual package from a recipe.

In FIG. 4, system 400 employs a dehydrator 420 to create a recipe 470 for creating a particular virtual package. System 400 begins with a reference virtual package 440 for an application and install media 450 for the application. Reference virtual package 440 and install media 450 may be stored on a computer-readable medium 430 (or may be stored on different computer-readable media), which may be external or internal to computer 410. Install media 450 may be the same install media used to install a conventional application onto a computer. Reference virtual package 440 may be created in any suitable way. For example reference virtual package 440 may be created by using the sequencer 320 of FIG. 3. In some embodiments, regardless of whether a sequencer is used, reference virtual package 440 encapsulates knowledge supplied by or derived from an expert.

In system 400, computer 410 may use a dehydrator 420 to create a recipe 470 from reference virtual package 440 and install media 450. Dehydrator 420 may be a collection of computer executable instructions, or other suitable component, that, when executed, extracts information from reference virtual package 440 and stores it in a format that can be used to create particular virtual packages. Computer 410 may have any operating system and/or environment and need not have the same operating system and/or environment of the computer for which the particular virtual package is intended.

Dehydrator 420 creates recipe 470 by comparing information in reference virtual package 440 with information in install media 450. For example, dehydrator 420 may parse reference virtual package 440 to identify its components and then determine how those components can be incorporated into a particular virtual package. This information may be recorded in the recipe.

For example, dehydrator 420 may identify a file in reference virtual package 440 or information establishing the environment in which reference virtual package 440 is to operate. Dehydrator may then compare these items from reference virtual package 440 with information in install media 450 to determine what information to place in recipe 470. For example, where dehydrator 420 identifies a file in reference virtual package 440 and that file is on install media 450, dehydrator 420 may store in recipe 470 the location of the file in reference virtual package 440 and/or the location of the file in install media 450.

By processing some or all of the information present in reference virtual package 440, dehydrator 420 will place in recipe 470 information that can be used to create a particular virtual package for the application. Dehydrator 420 may store recipe 470 on a computer-readable medium 460, which may be external or internal to computer 410.

In FIG. 5, system 500 employs a rehydrator 520 to create a particular virtual package 570. System 500 begins with a recipe 540 and install media 550 for the application. Recipe 540 and install media 550 may be stored on a computer-readable medium 530 (or may be stored on different computer-readable media), which may be external or internal to computer 510. Recipe 540 may be created using system 400 of FIG. 4 or may be created in any other suitable way. Install media 550 may be the same install media used to install a conventional application onto a computer.

In system 500, computer 510 may use a rehydrator 520 to create a particular virtual package 570 from recipe 540 and install media 550. Rehydrator 520 creates particular virtual package 570 by using the information contained in recipe 540. For example, rehydrator 520 may process some or all of the information in recipe 540. For example, rehydrator 520 may select information from recipe 540 indicating that a file on install media 550 may be placed in a specified location in a particular virtual package 570, and then rehydrator 520 may copy that file from install media 550 to the specified location in particular virtual package 570. Rehydrator may select information from recipe 540 indicating that recipe 540 contains the contents and location of a file to be copied to particular virtual package 570, and rehydrator may copy the file from recipe 540 to the specified location in particular virtual package 570. Rehydrator may also select information from recipe 540 indicating changes to the environment of particular virtual package 570 and may insert into particular virtual package 570 information that will result in the indicated changes when the particular virtual package is installed.

By processing some or all of the information present in recipe 540, rehydrator 520 will create particular virtual package 570. Rehydrator 520 may store particular virtual package 570 on a computer-readable medium 560, which may be external or internal to computer 510.

Figure 6:
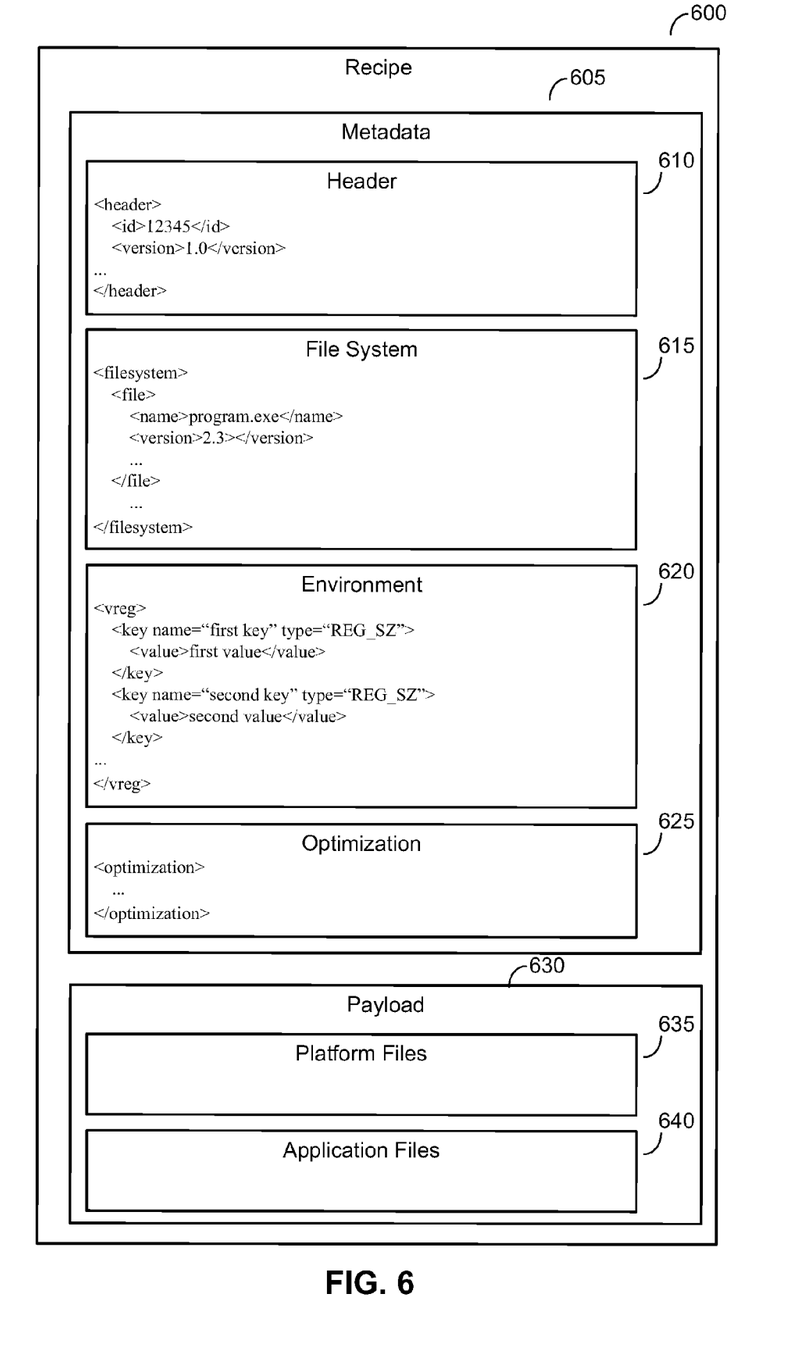
FIG. 6 illustrates an exemplary recipe that may be used with embodiments of the invention.

FIG. 6 illustrates an exemplary recipe 600 that may be used in accordance with embodiments of the invention. Embodiments of the invention may use any suitable format for recipe 600, and are not limited to the particular examples described herein. Recipe 600 may contain information that may be used by a rehydrator to create a particular virtual package from install media, and may contain one or more sections. The number and types of sections, however, are not a limiting feature of the invention. For example, recipe may contain a metadata section 605 and a payload section 630. Each section of recipe 600 may contain further subsections. Metadata section 605 may contain a header subsection 610, a file system subsection 615, an environment subsection 620, and an optimization subsection 625. Payload section 630 may contain a platform files section 635 and an application files section 640. The number and types of subsections are also not limiting features of the invention. The sections and subsections of recipe 600 may be stored in any suitable manner. For example, the sections and subsections may be stored in a single file, may be stored in separate files, or may be stored in an archive format containing multiple files such as a cabinet file or a zip file.

Metadata section 605 of recipe 600 may store information in any suitable way. For example metadata section 605 may store information using extensible markup language. Subsections of metadata section 605 may also store information using extensible markup language.

Metadata section 605 may include a header subsection 610 that includes general information about the recipe, such as an id number, a version number, a date of creation timestamp, a date of modification timestamp, a compression type, a block size, and historical information. Any suitable information may be included in header subsection 610, and the invention is not limited to any particular types of information.

Metadata section 605 may include a file system subsection 615 that includes information about the file system and individual files that may be included in the virtual package when the recipe is applied. The files, per se, need not be included in this section if a suitable identification of the files is included. For example file system subsection 615 may include a long file name, a short file name, file attributes, a version number, an id number, a file hash, and the location of the file on the install media, and the location of the file in the virtual package. Any suitable information may be included in file system subsection 615 and the invention is not limited to any particular types of information.

Metadata section 605 may include an environment subsection 620 that includes information about the environment to be created when the virtual package is installed. For example, environment subsection 620 may include keyvalue pairs to be stored in a centralized repository (such as a registry) of the virtual package environment, virtual fonts, and a short path table. Any suitable information may be included in environment subsection 620 and the invention is not limited to any particular types of information.

Metadata section 605 may include an optimization subsection 625 that includes information to optimize the performance of the virtual package. For example, some virtual packages may be very large and require a significant amount of time to download to a user's computer. Waiting for the entire virtual package to download may require the user to wait for a significant length of time before being able to use the virtual application. For some virtual packages, however, the user may be able to download necessary portions of the virtual package first and download other portions of the virtual package later. By downloading the necessary portions of the virtual package first, the user may be able to launch the virtual application in a relatively short length of time. Optimization subsection 625 may indicate which portions of the virtual package should be downloaded first and which portions may be downloaded later. Any suitable information may be included in optimization subsection 625 and the invention is not limited to any particular types of information.

Payload section 630 of recipe 600 may store in any suitable way information to be included in the particular virtual package when the recipe is applied. This information may include files that are to be included in the particular virtual package. For example payload section 630 may store files using an archive format, such as a cabinet file or a zip file. Subsections of payload section 630 may also store files using a cabinet file or a zip file. In some embodiments, payload section 630 of recipe 600 may exclude files that contain executable code.

Payload section 630 may include a platform files subsection 635 that may store files used by the virtual application client. For example, platform files subsection 635 may include configuration files and manifest files used by the virtual application client. Any suitable information may be included in platform files subsection 635 and the invention is not limited to any particular types of information.

Payload section 630 may include an application files subsection 640 that may store files that are part of the virtual application. For example, the files in the application files subsection may include shortcuts created by the conventional application installation, configuration files created by the conventional application installation, and other files that are not found on the installation media. Any suitable information may be included in application files subsection 640 and the invention is not limited to any particular types of information.

Figure 7:
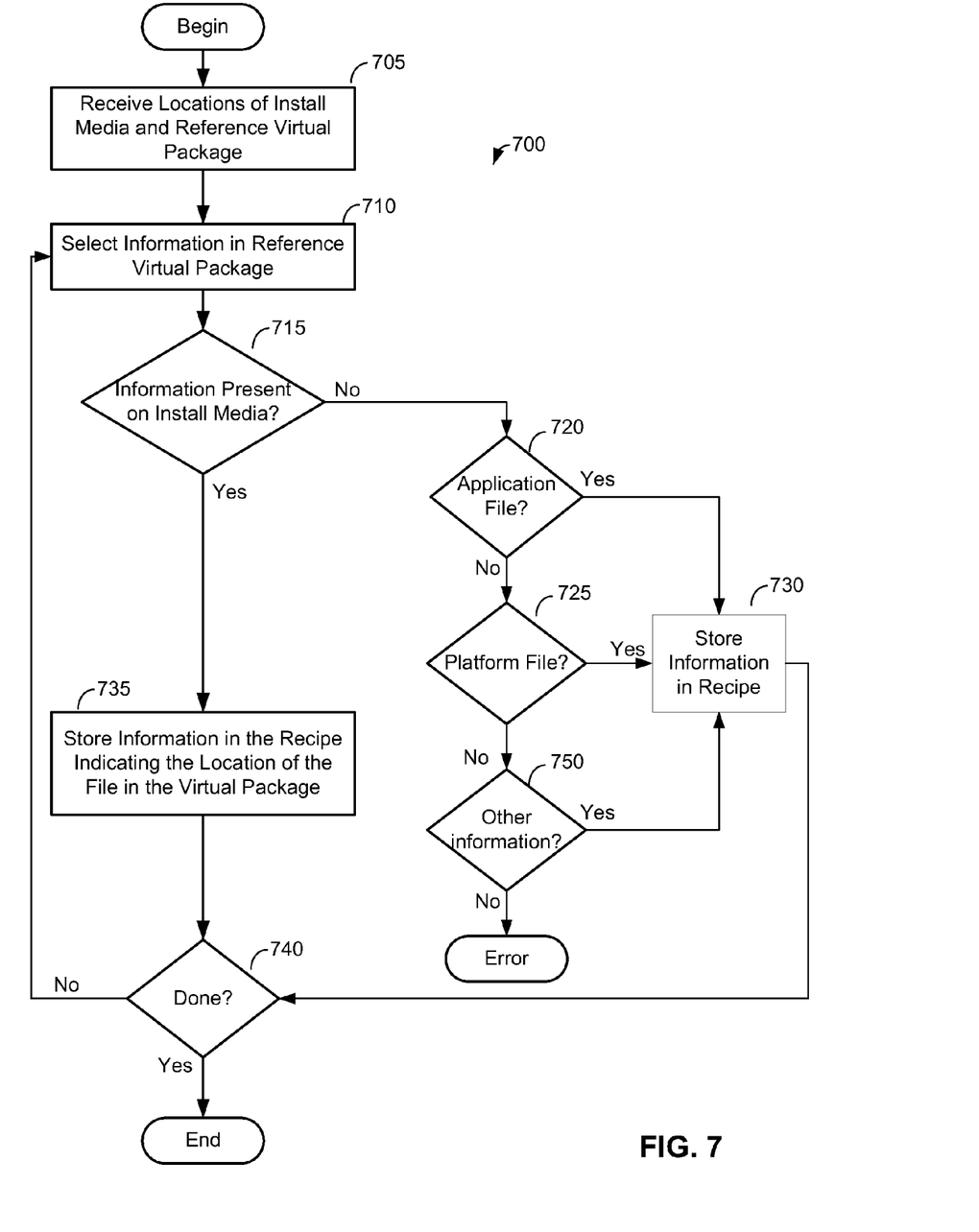
FIG. 7 is a flowchart of an exemplary process for creating a recipe for creating a particular virtual package from a reference virtual package and install media.

FIG. 7 shows an example of a process 700 for creating a recipe for creating a particular virtual package from a reference virtual package and install media. The process begins at block 705, where the location of the install media for the application and the location of a reference virtual package are received. The locations may be specified in any suitable manner, including, for example, a file system path or a network location.

The process continues to block 710 where the reference virtual package is parsed such that items in the reference virtual package may be separately processed. In this way, items of information may be selected from the reference virtual package in turn, though it should be appreciated that it is not a requirement that items in the reference package be processed sequentially. The items selected from the reference virtual package may identify things such as a file in the reference virtual package, information from the environment of the virtual package, or other information, such as attributes of a file in the reference virtual package. The types of information selected from the reference virtual package is not a limiting feature of the invention.

The process continues to block 715 where it is determined whether the information selected from the reference virtual package in block 710 is present on the install media. For example, if the selected information is a file in the reference virtual package, block 715 may determine whether a copy of the file is present on the install media.

If the selected information is not present on the install media, the process proceeds to block 720. In block 720 it is determined whether the selected information is a file that is part of the virtual application. If the selected information is a file that is part of the virtual application, the process proceeds to block 730 where the selected information is stored in the recipe. For example, where the selected information is a file that is part of the virtual application, the selected information may be stored in the application files subsection of the payload section of the recipe as indicated in FIG. 6.

If at block 720 it is determined that the selected information is not a file that is part of the virtual application, the process proceeds to block 725 where it is determined whether the selected information is a platform file relating to the virtual application client 240 of FIG. 2. If the selected information is a platform file, the process proceeds to block 730 where the selected information is stored in the recipe. For example, where the selected information is a platform file, the selected information may be stored in the platform files subsection of the payload section of the recipe as indicated in FIG. 6.

If at block 725 it is determined that the selected information is not a platform file, then the process proceeds to block 750 where it is determined whether the selected information is other information understood by process 700. If the selected information is understood, the process proceeds to block 720 where the selected information is stored in the recipe. For example, if the selected information is metadata relating to the environment of the virtual package, the selected information may be stored in the environment subsection of the metadata subsection of the recipe as indicated in FIG. 6. If the selected information relates to a file attribute, the selected information may be stored in the file system subsection of the metadata section of the recipe as indicated in FIG. 6. The invention is not limited to any particular types of metadata, and any suitable metadata relating to the reference virtual package may be stored in the recipe.

If at block 750 it is determined that the selected information is not understood, process 700 may raise an error as it may not know how to process the selected information. In response to such an error, manual input may be received or the error may be dealt with in any suitable way. Raising an error at this point may preclude unintended information from being added to the recipe and hence to a particular virtual package created from the recipe. In such an embodiment, the recipe may be copied and distributed without raising technical or legal concerns that might arise, for example, if copyrighted images or software were inserted into the recipe.

Returning to block 715, if the selected information is present on the install media, the process continues to block 735 where information is stored in the recipe indicating that the selected information may be found on the install media. For example, in some embodiments an entry may be added to the file system subsection of the metadata section of the recipe shown in FIG. 6, including the location of the selected information on the install media and/or the location of the selected information in the reference virtual package.

Following block 735 and block 730, the process proceeds to block 740 where it is determined whether the process is complete. In some embodiments, process 700 may iterate over all information contained in reference virtual package, while in other embodiments process 700 may iterate over a subset of the information contained in reference virtual package. Regardless of the amount of the reference virtual package to be processed, if additional information in reference virtual package remains to be processed, then the process returns to block 715 where additional information is selected from the reference virtual package. If no more information remains to be processed, then the process is complete.

Once the process of completing the recipe is complete, the recipe may be used to create a particular virtual package. In some scenarios, the recipe may be used by the entity that created it. Though, in many scenarios, the recipe will be distributed to people or entities other than those who created it. For example, the recipe may be created by an expert, such as a consultant or a company specializing in virtualizing applications. The expert may distribute the recipe in any suitable way.

Figure 8:
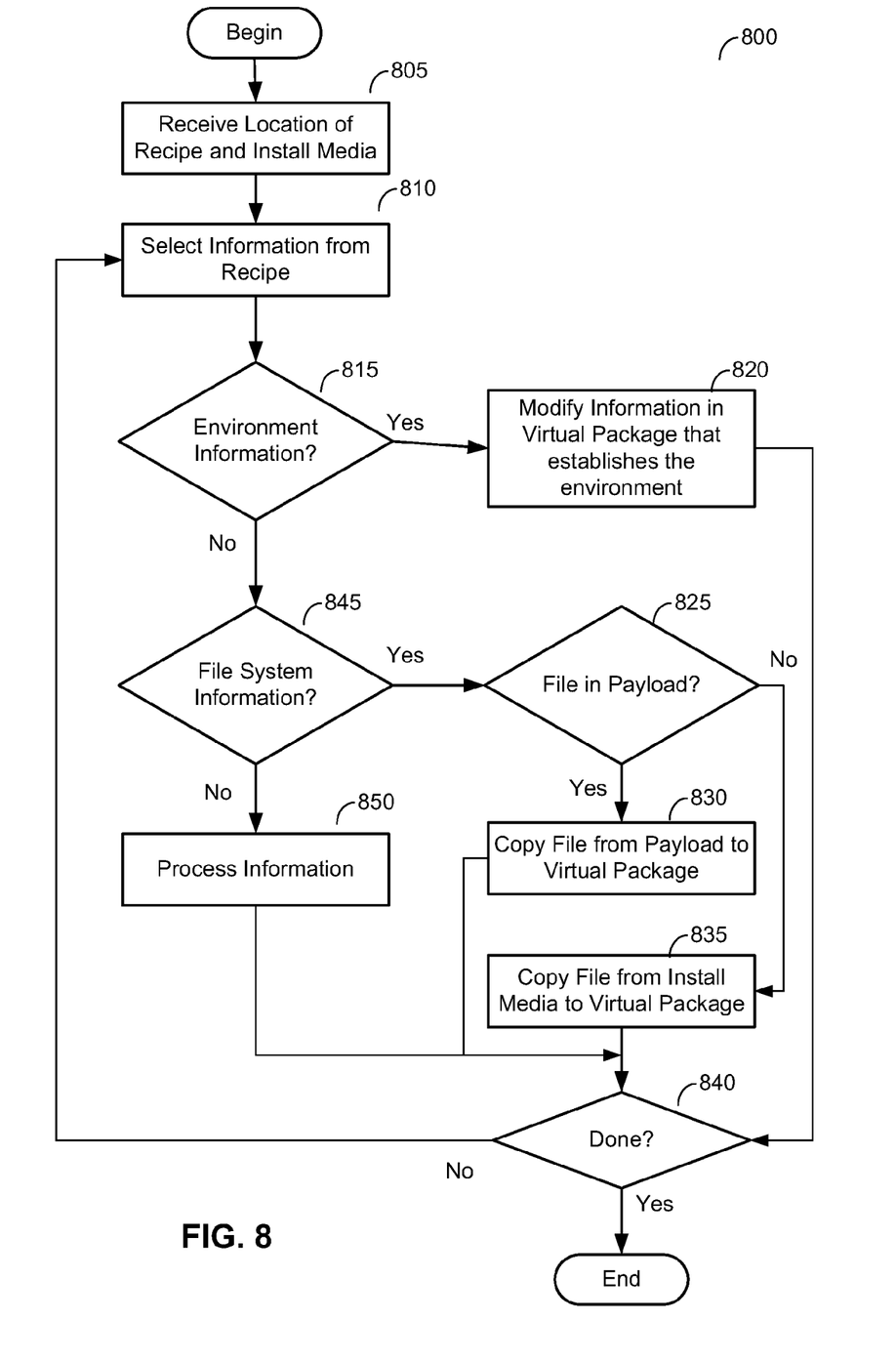
FIG. 8 is a flowchart of an exemplary process for creating a particular virtual package from a recipe and install media

Regardless of who uses the recipe and how it is obtained, it may be used to create a particular virtual package. FIG. 8 shows an example of a process 800 for creating a particular virtual package from a recipe and install media. The process begins at block 805, where the location of the recipe and install media for the application are received. The locations may be specified in any suitable manner, including, for example, a file system path or a network location.

The recipe may be parsed and items in the recipe may be selected and processed in any suitable order. Accordingly, the process continues to block 810 where information is selected from the recipe. The information selected from the recipe could include, for example, any of the metadata shown in FIG. 6, but the information selected from the recipe need not be in the form of metadata and is not limited to the information in FIG. 6.

The process continues to block 815 where it is determined if the selected information relates to the environment of the virtual package. If the selected information relates to the environment of the virtual package, the process continues to block 820 where the environment of the virtual package is modified as indicated be the selected information. Following block 820, the process continues to block 840.

Returning to block 815, if the selected information does not relate to the environment of the virtual package, the process continues to block 845 where it is determined if the selected information relates to a file of the virtual package. If the selected information relates to a file of the virtual package, the process continues to block 825.

At block 825 it is determined if the file associated with the selected information is in the payload section of the recipe. If the file associated with the selected information is in the payload section of the recipe, then the process continues to block 830 where the file is copied from the payload of the recipe to the virtual package in accordance with the selected information. If the file associated with the selected information is not in the payload section of the recipe, then the process continues to block 835 where the file is copied from the install media to the virtual package in accordance with the selected information. Following block 830 or block 835, the process continues to block 840.

Returning to block 845, if the selected information does not relate to a file of the virtual package, then the process continues to block 850. At block 850, the selected information is processed appropriately. For example, the selected information could correspond to the header subsection or the optimization subsection of FIG. 6. The invention is not limited to any particular type of information contained in the recipe, and any appropriate processing may be applied to other types of information in the recipe. Following block 850, the process continues to block 840.

At block 840, it is determined if process 800 is complete. In some embodiments, process 800 may process all of the information contained in the recipe, while in other embodiments process 800 may process only a subset of the information in the recipe. If there is information in the recipe remaining to be processed, process 800 continues to block 810 to select additional information from the recipe. If no information remains to be processed, process 800 is complete.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device for automatically generating a resource-efficient computer application program installation package for installing a computer application program onto a first virtual computing environment, the computing device comprising:

one or more processing units; and
computer-readable media comprising computer-executable instructions, which, when executed by the one or more processing units, cause the computing device to:
receive, as input, both: (1) computer application program install media and (2) a second virtual computing environment comprising the computer application program, the computer application program having been installed onto the second virtual computing environment from the computer application program install media;
identify a set of files on the second virtual computing environment that were changed, modified or created by installation of the computer application program onto the second virtual computing environment;

determine, from among the identified set of files, a first subset that were part of the second virtual computing environment prior to the installation of the computer application program onto the second virtual computing environment;

generate a first portion of the installation package comprising enumeration of changes made to the first subset of files by the installation of the computer application program onto the second virtual computing device;

determine, from among the identified set of files, a second subset that were copied onto the second virtual computing environment from the computer application program install media during the installation of the computer application program onto the second virtual computing environment; and generate a second portion of the install package comprising pointers into the computer application program install media, the pointers identifying the second subset of files.

2. The computing device of claim 1, wherein the computer application program installation package further comprises content of the computer application program install media independently of the first and second portions.

3. The computing device of claim 1, wherein the enumeration of changes made to the first subset of files comprises key-value pairs defining parameters of an environment of the second virtual computing environment onto which the computer application program was installed.

4. The computing device of claim 1, wherein the enumeration of changes made to the first subset of files comprises access control information limiting access of the computer application program as installed on the second virtual computing environment.

5. The computing device of claim 1, wherein the second portion of the install package further comprises hash values of at least some of the second subset of files.

6. The computing device of claim 1, wherein at least some of the enumeration of changes made to the first subset of files is expressed using an extensible markup language.

7. The computing device of claim 1, wherein the computer-readable media comprise further computer-executable instructions, which, when executed by the one or more processing units, cause the computing device to perform further steps comprising:

determine, from among the identified set of files, a third subset that were part of the second virtual computing environment prior to the installation of the computer application program onto the second virtual computing environment and were modified by the installation of the computer application program onto the second virtual computing environment, the third subset differing from the first subset; and generate a third portion of the installation package comprising copies of the third subset of files.

8. The computing device of claim 1, wherein the computer-readable media comprise further computer-executable instructions, which, when executed by the one or more processing units, cause the computing device to perform further steps comprising:

generate a third portion of the installation package comprising information indicative of locations where at least some the identified set of files were stored as part of the installation of the computer application program onto the second virtual computing environment.

9. A computing device for automatically installing a computer application program onto a virtual computing environment such that the computer application program has a first configuration in the virtual computing environment, the computing device comprising:

one or more processing units; and computer-readable media comprising computer-executable instructions, which, when executed by the one or more processing units, cause the computing device to:

receive, as input, both: (1) a resource-efficient computer application program installation package and (2) computer application program install media, the computer application program install media comprising, independently of the resource-efficient computer application program installation package, computer-executable instructions that, if executed by the one or more processing units, would result in an installation of the computer application program having a second configuration differing from the first configuration;

modify a first set of files of the virtual computing environment, that were already preexisting prior to the installing, in accordance with information from a first portion of the resource-efficient computer application program installation package; and copy, from the computer application program install media, a second set of files of the computer application program into the virtual computing environment, wherein a second portion of the resource-efficient computer application program installation package comprises pointers into the computer application program install media, the pointers identifying the second set of files.

10. The computing device of claim 9, wherein the computer-executable instructions that cause the computing device to modify the first set of files of the virtual computing environment comprise computer-executable instructions, which, when executed by the one or more processing units, cause the computing device to change key-value pairs that define parameters of the virtual computing environment.

11. The computing device of claim 9, wherein the computer-executable instructions that cause the computing device to copy the second set of files from the computer application program install media into the virtual computing environment comprise computer-executable instructions, which, when executed by the one or more processing units, cause the computing device to verify hash values of at least some of the second set of files prior to copying them, the hash values being part of the second portion of the resource-efficient computer application program installation package.

12. The computing device of claim 9, wherein the computer-readable media comprise further computer-executable instructions, which, when executed by the one or more processing units, cause the computing device to overwrite a third set of files of the virtual computing environment, that were already preexisting prior to the installing, with files from a third portion of the resource-efficient computer application program installation package.

13. The computing device of claim 9, wherein the second subset of files are copied into locations within the virtual computing environment that are identified by a third portion of the resource-efficient computer application program installation package, the third portion being wholly separate from the second portion.

14. A method for automatically generating a resource-efficient computer application program installation package for installing a computer application program onto a first virtual computing environment, the method comprising:

receiving as input, at a computing device, both: (1) computer application program install media and (2) a second virtual computing environment comprising the computer application program, the computer application program having been installed onto the second virtual computing environment from the computer application program install media;

identifying, by the computing device, a set of files on the second virtual computing environment that were changed, modified or created by installation of the computer application program onto the second virtual computing environment;

determining, by the computing device, from among the identified set of files, a first subset that were part of the second virtual computing environment prior to the installation of the computer application program onto the second virtual computing environment;

generating, by the computing device, a first portion of the installation package comprising enumeration of changes made to the first subset of files by the installation of the computer application program onto the second virtual computing device;

determining, by the computing device, from among the identified set of files, a second subset that were copied onto the second virtual computing environment from the computer application program install media during the installation of the computer application program onto the second virtual computing environment; and generating, by the computing device, a second portion of the install package comprising pointers into the computer application program install media, the pointers identifying the second subset of files.

15. The method of claim 14, wherein the computer application program installation package further comprises content of the computer application program install media independently of the first and second portions.

16. The method of claim 14, wherein the enumeration of changes made to the first subset of files comprises key-value pairs defining parameters of an environment of the second virtual computing environment onto which the computer application program was installed.

17. The method of claim 14, wherein the enumeration of changes made to the first subset of files comprises access control information limiting access of the computer application program as installed on the second virtual computing environment.

18. The method of claim 14, wherein the second portion of the install package further comprises hash values of at least some of the second subset of files.

19. The method of claim 14, further comprising:

determining, by the computing device, from among the identified set of files, a third subset that were part of the second virtual computing environment prior to the installation of the computer application program onto the second virtual computing environment and were modified by the installation of the computer application program onto the second virtual computing environment, the third subset differing from the first subset; and generating, by the computing device, a third portion of the installation package comprising copies of the third subset of files.

20. The method of claim 14, further comprising:

generating, by the computing device, a third portion of the installation package comprising information indicative of locations where at least some the identified set of files were stored as part of the installation of the computer application program onto the second virtual computing environment.

* * * * *